No. 664,638. Patented Dec. 25, 1900.
S. C. HITCHCOCK.
SPRING SEAT ATTACHMENT.
(Application filed Aug. 21, 1899.)
(No Model.)
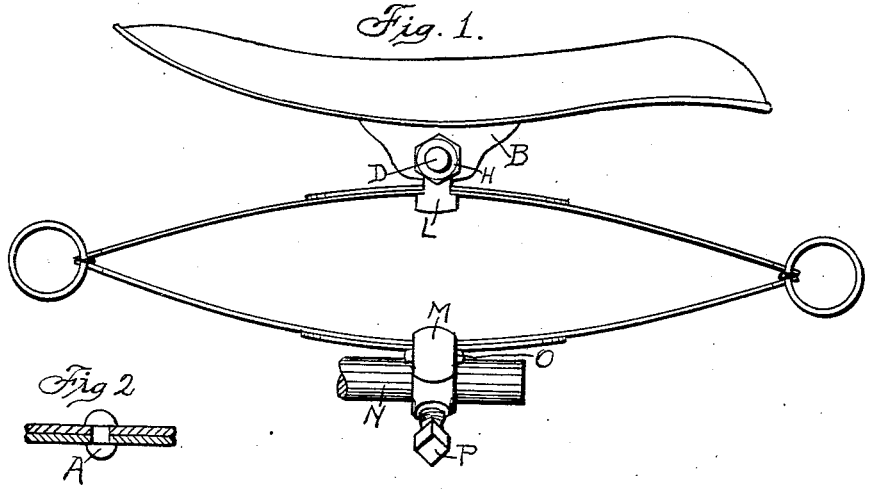
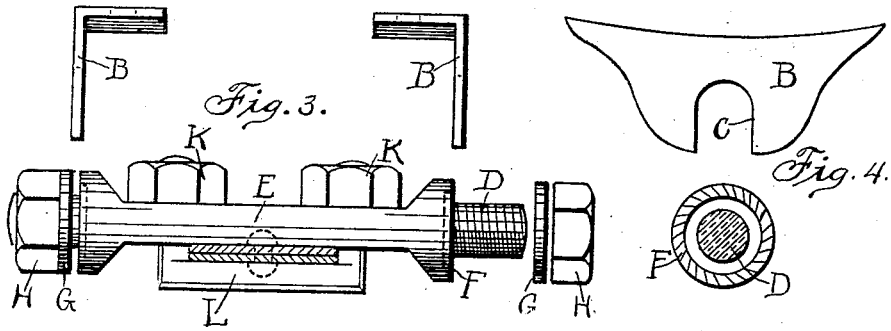
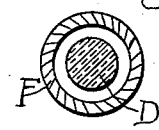
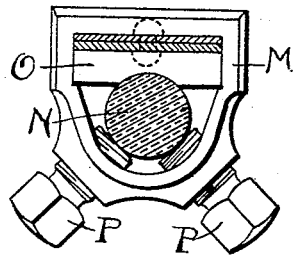
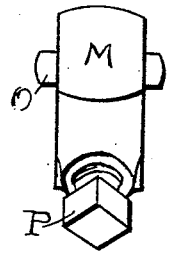
WITNESSES;
E. S. Lemme
L. A. Nicholson
INVENTOR;
Solomon C. Hitchcock
BY
G. W. Bullard,
ATTORNEY
THE NORRIS PETERS CO., PHOTO-LITHO., WASHINGTON, D. C.

UNITED STATES PATENT OFFICE.

SOLOMON C. HITCHCOCK, OF TACOMA, WASHINGTON.

SPRING-SEAT ATTACHMENT.

SPECIFICATION forming part of Letters Patent No. 664,638, dated December 25, 1900.

Application filed August 21, 1899. Serial No. 727,966. (No model.)

*To all whom it may concern:*

Be it known that I, SOLOMON C. HITCHCOCK, a citizen of the United States, residing at Tacoma, in the county of Pierce and State of Washington, have invented a new and useful Spring-Seat Attachment for Bicycles, of which the following is a specification.

My invention relates to means for attaching an elliptical spring to bicycle-frames and for mounting the seat thereon. It is more especially designed to be used in combination with my ball-bearing patented spring, Patent No. 624,033, issued May 2, 1899, and is to be considered an improvement thereon.

The object of my invention is to attach the spring firmly to the bicycle-frame and to provide an adjustable attachment for securely mounting the seat on the spring. I attain this object by means of the apparatus illustrated by the accompanying drawings, in which—

Figure 1 is a side view of my elliptical spring and a bicycle-seat mounted with my attachments. Fig. 2 is a section at the center of one-half of the spring, showing the fixed round-headed rivet that holds the spring-leaves together. Fig. 3 is a front view of the several parts of my invention used to mount the seat. Fig. 4 is a side view of the same. Fig. 5 is a front view of my device for attaching the spring to the bicycle-frame, and Fig. 6 is a side view of the same.

Similar letters refer to similar parts in the several views.

The leaves of the elliptical spring are to be riveted together at their centers, as shown at A, Fig. 2.

My device for mounting the seat on the spring consists of two brackets or angle-pieces B B, screwed firmly to the under side of the seat. These brackets or angle-pieces have crotch-openings C in their lower edge, that fit to the arms D D of a cross-piece or cross-head E, that rests on top of the spring. The cross-piece has serrated shoulders F F, and each arm is mounted with a washer G and a screw-nut H. The angle-pieces are set on the arms of E and adjusted to the angle desired. The nut on each arm is then screwed tight and the saddle is held firmly in place. The cross-piece E has a socket on the under side to receive the head of the rivet A and is provided with a clamp-piece L, that also is made with a socket to fit the rivet-head on the under side of this section of the spring. This clamp-piece tightly embraces the spring by means of the nuts K K being screwed down. The cross-piece, with the saddle attached thereto, is now firmly mounted on the springs. The cross-piece, as a matter of convenience, is preferably bolted to the spring before the angle-pieces of the saddle are fastened thereto. The saddle is easily adjusted to any desired angle.

The lower member of the spring is fastened to the bicycle-frame by means of the metallic piece M, which encircles the spring lower leaves and the seat-pin N of the bicycle. A clamp-piece O, formed to fit the seat-pin and the rivet-head, is inserted between the spring and the pin when the set-screws P P are screwed hard against N and the spring is rigidly set on the bicycle-frame. A socket formed in M to fit the rivet-head prevents the spring from slipping to the front or rear.

Having thus described my invention, what I claim as new, and desire to secure by Letters Patent, is—

1. In a spring-seat attachment for bicycles, the combination with the seat and its supporting-spring, said spring having heads projecting above and below a portion thereof, of a cross-piece resting upon the spring and having a socket to receive one of said heads, a clamp passing beneath the spring and having a socket to receive the head on the under side of a portion of the spring, means for securing said clamp, spring and cross-head together, brackets secured to the seat and rotatably supported upon the end of said cross-head, and means for binding said brackets to said cross-head, substantially as described.

2. In a spring-seat attachment for bicycles, the combination with the seat, a supporting-spring and a pin for sustaining said seat and spring, said spring extending parallel with the seat-pin and having heads projecting above and below a portion of the spring, of a clamp encircling said spring and seat-pin and having a socket to receive the head projecting above a portion of the spring to prevent said spring and clamp from slipping one upon the other, a plate lying within the clamp between the spring and said sustaining-pin, and having a socket to receive the head projecting from the under portion of the spring to prevent the plate and spring from slipping one upon the other and a recess to receive the seat-pin, and means bearing against the seat-pin for binding the several parts together in various adjustments of the spring on the seat-pin, substantially as described.

In testimony whereof I affix my signature in the presence of two witnesses.

SOLOMON C. HITCHCOCK.

Witnesses:
    THOS. D. HITCHCOCK,
    G. W. BULLARD.